United States Patent [19]
Skotheim et al.

[11] Patent Number: 5,961,672
[45] Date of Patent: Oct. 5, 1999

[54] STABILIZED ANODE FOR LITHIUM-POLYMER BATTERIES

[75] Inventors: Terje A. Skotheim; Grigorii L. Soloveichik; Alexei B. Gavrilov, all of Tucson, Ariz.

[73] Assignee: Moltech Corporation, Tucson, Ariz.

[21] Appl. No.: 08/889,202

[22] Filed: Jul. 7, 1997

Related U.S. Application Data

[63] Continuation-in-part of application No. 08/618,111, Mar. 19, 1996, Pat. No. 5,648,187, which is a continuation of application No. 08/197,140, Feb. 16, 1994, abandoned.

[51] Int. Cl.$^6$ .................................................. H01M 10/40
[52] U.S. Cl. ...................... 29/623.5; 429/306; 429/324
[58] Field of Search ........................ 29/623.5; 429/192, 429/306, 303, 324

[56] References Cited

U.S. PATENT DOCUMENTS

| | | |
|---|---|---|
| 4,002,492 | 1/1977 | Rao . |
| 4,069,375 | 1/1978 | Lauck . |
| 4,695,521 | 9/1987 | Shacklette et al. . |
| 5,314,765 | 5/1994 | Bates ................................ 29/623.5 X |
| 5,354,631 | 10/1994 | Chaloner-Gill et al. . |
| 5,434,021 | 7/1995 | Fauteux et al. . |
| 5,487,959 | 1/1996 | Koksbang ........................... 429/192 X |
| 5,529,860 | 6/1996 | Skotheim et al. . |
| 5,601,947 | 2/1997 | Skotheim et al. . |
| 5,648,187 | 7/1997 | Skothem ............................. 429/192 X |
| 5,690,702 | 11/1997 | Skotheim et al. . |

FOREIGN PATENT DOCUMENTS

| | | |
|---|---|---|
| 2328299 | 5/1977 | France . |
| 58-163188 | 9/1983 | Japan . |

OTHER PUBLICATIONS

Besenhard, "Cycling Behaviour and Corrosion of Li–Al Electrolytes in Organic Electrodes," J. Electroanal. Chem., 1978, vol. 94, pp. 77–81 (no month).

Ozawa et al., "Cycle Performance of Lithium Ion Rechargeable Battery," Proceedings of the 10th International Seminar on Primary and Secondary Technology and Application: A Special Anniversary 4–day Seminar and Workshop, Mar. 1–4, 1993, pp. 1–5 plus 28 pages of figures.

Rao et al., "Lithium–Aluminum Electrode," J. Electrochem. Soc.: Electrochemical Science and Technology, Oct. 1977, vol. 124, No. 10, pp. 1490–1492.

Yamamoto et al., "Electrochemical and Electric Properties of Vacuum–Deposited Poly(arylenes): Electrochemical Activity, Diode, and Electrochemiluminescence," J. Phys. Chem., Oct. 29, 1992, vol. 96, No. 22, pp. 8677–8679.

*Primary Examiner*—John S. Maples
*Attorney, Agent, or Firm*—Morrison & Foerster LLP

[57] ABSTRACT

The invention relates to thin film solid state electrochemical cells consisting of a lithium metal anode, a polymer electrolyte and a cathode, where the lithium anode has been stabilized with a polymer film capable of transmitting lithium ions. Methods for making battery cells using the anode stabilizing films of the invention are disclosed.

55 Claims, 13 Drawing Sheets

STABILIZED ANODE FOR LITHIUM-POLYMER BATTERIES

RELATED APPLICATION

This application is a continuation-in-part of application Ser. No. 08/618,111, filed Mar. 19, 1996, now U.S. Pat. No. 5,648,187 which is a continuation of application Ser. No. 08/197,140, filed Feb. 16, 1994, which is now abandoned.

TECHNICAL FIELD

This invention relates to thin film solid state electrochemical cells. More particularly, this invention relates to novel stabilized negative electrodes for electrochemical cells, consisting of a lithium metal coated with a thin film of an electroactive polymer capable of transmitting alkali metal ions interposed between the lithium anode and the polymer electrolyte.

BACKGROUND

Throughout this application, various publications, patents, and published patent applications are referred to by an identifying citation. The disclosures of the publications, patents and published patent specifications referenced in this application are hereby incorporated by reference into the present disclosure.

Rechargeable lithium-polymer batteries are promising advanced power sources for a variety of applications such as for portable electronic devices and electric vehicles. Although a variety of polymer electrolytes have been investigated as the ionic conducting medium, the reactivity of lithium metal has posed a formidable challenge to develop polymer electrolytes which have the requisite chemical and electrochemical stability for long cycle life [F. M. Gray, *Solid Polymer Electrolytes* (VCH Publishers, Inc., New York 1991)].

A key problem with lithium metal anodes is the formation of dendrites upon repeated plating of lithium metal during charging of the battery. This has led to a detailed investigation of lithium alloys, such as lithium-aluminum alloys, and lithium-carbon composites as alternatives to lithium metal anodes. U.S. Pat. No. 4,002,492 discloses electrochemical cells having anodes consisting of lithium-aluminum alloys where the content of lithium is from 63% to 92%. Other disclosures of lithium-aluminum anodes are found in Rao et al., *J Electrochem. Soc.* 1977, 124, 1490, and Besenhard, *J. Electroanal. Chem.*, 1978, 94, 77. The use of lithium-carbon composite anodes is disclosed in Ozawa et al., in Proc. Tenth International Seminar on Primary and Secondary Battery Technology and Applications, Deerfield Beach, Fla., March 1993.

The central problem with composite lithium anodes is an increase in weight and volume due to the addition of non-electroactive materials. In the case of lithium-aluminum alloys, there is also a loss in potential of about 0.4 V. The loss in cell voltage coupled with increased weight implies a significant loss in specific energy of the cell. Batteries using lithium-aluminum alloys as anodes have exhibited relatively low capacities, low rate capabilities and poor cycle life.

Lithium-carbon composites based on intercalation in graphitic carbon generally have a voltage drop of 0.3 V–0.5 V versus lithium and typically involve 8–10 carbon atoms for each lithium atom, the theoretical maximum being 6 carbon atoms for each lithium atom. This entails a significant penalty in increased weight and volume, and consequently, decreased capacity. Cells using lithium-carbon composite anodes have, however, demonstrated long cycle life, with more than 1,000 cycles recorded.

Shacklette et al. disclose the use of a conjugated polymer-lithium composite anode in U.S. Pat. No. 4,695,521, which incorporates an n-doped conjugated polymer as a substrate for electroplating a lithium metal, resulting in finely divided lithium metal distributed throughout a conducting polymer matrix. Cells incorporating conjugated polymer-lithium composite anodes have long cycle life, but reduced capacity. The n-doped conjugated polymers have low capacity that limits the capacity of the anode material.

Toyoguchi et al., disclose the use of a prefabricated film of a conjugated polymer to contact the lithium surface of an anode in a cell using a liquid organic electrolyte in Kokai 58-163188 (1983). Cells with lithium anodes contacted with a conjugated polymer showed enhanced cycling ability compared with equivalent cells using bare lithium anodes. Prefabricated conjugated polymer films are highly porous and at least 10 micrometers ($\mu$m) thick in order to have sufficient mechanical strength to be free-standing. Porous films are not suitable if the electrolyte is polymeric since a polymer electrolyte cannot penetrate the pores of the film, resulting in inferior contact between the conjugated polymer and the electrolyte. With liquid organic electrolyte, a porous film does not provide complete surface coverage, and therefore not as complete protection as a dense polymer film. The relatively thick prefabricated conjugated polymer films also add significant weight and volume to the cell, limiting the capacity of the cell.

There is a clearly defined need, therefore, for novel concepts in interfacial engineering of the lithium-electrolyte interface that allows the fabrication of rechargeable lithium cells having long cycle life and incorporating polymer electrolytes.

SUMMARY OF THE INVENTION

The present invention obviates one or more of the disadvantages of electrochemical cells using anodes made from lithium alloys, lithium-carbon composites and lithium-conducting polymer composites, by providing a lithium metal anode that has been stabilized against dendrite formation by the use of a vacuum evaporated thin film of a lithium-ion conducting polymer interposed between the lithium metal and the electrolyte. The present invention also provides a rechargeable, high energy density electrochemical battery cell that comprises:

(a) a lithium anode;

(b) a thin film of a lithium metal-ion conducting polymer which is doped n-type by the incorporation of lithium ions and which is deposited on the lithium anode surface by vacuum evaporation;

(c) a non-aqueous liquid or polymeric electrolyte containing a lithium salt dissolved therein; and, (d) a cathode containing a cathode active material.

Another aspect of the present invention pertains to methods for making battery cells comprising an anode stabilizing film.

In one embodiment, said method for making a battery cell comprises:

(a) providing a lithium anode;

(b) providing a non-aqueous organic electrolyte containing a dissolved lithium salt;

(c) depositing an anode stabilizing film, wherein said anode stabilizing film is deposited on said lithium anode using a low molecular weight monomeric or oligomeric material as the source of vapors; and wherein said anode stabilizing film is interposed between the lithium anode and the electrolyte; and, (d) providing a cathode comprising a cathode active material;

wherein said electrolyte is between the lithium anode and said cathode.

In one embodiment, the anode stabilizing film has a thickness in the range 0.01 to 10 micrometers. In one embodiment, the anode stabilizing film has a thickness in the range 0.01 to 0.1 micrometers. In a preferred embodiment, the anode stabilizing film has a thickness in the range 0.1 to 5.0 micrometers.

In one embodiment, the low molecular weight monomeric source material is acetylene. In one embodiment, said deposited anode stabilizing film has a chemical structure different to that of said acetylene. In one embodiment, the anode stabilizing film is deposited at a temperature of 25° C. or greater. In one embodiment, the anode stabilizing film is deposited at a temperature of 100° C. or greater.

In one embodiment, said anode stabilizing film is deposited by vacuum evaporation. In one embodiment, said anode stabilizing film is deposited by plasma-assisted vacuum evaporation. In one embodiment, said anode stabilizing film is deposited using a conjugated oligomeric material as an evaporation source, and said anode stabilizing film has a different chemical structure than said conjugated oligomeric material. In one embodiment, said conjugated oligomeric material is selected from the group consisting of: oligomers of poly(p-phenylene), polyacetylene, poly(phenylene vinylene), polyazulene, poly(perinaphthalene), polyacenes, and poly(naphthalene-2,6-diyl).

In one embodiment, said electrolyte is a liquid electrolyte comprising one or more electrolyte solvents and a dissolved lithium salt. In one embodiment, the electrolyte is a polymer electrolyte containing a dissolved lithium salt. In one embodiment, the polymer electrolyte is a single-ion conducting polymer electrolyte. In one embodiment, the polymer electrolyte is a gel polymer electrolyte. In one embodiment, said lithium salt is selected from the group consisting of: $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2$, and lithium salts of fluorosulfonated phenols and pyrroles.

In one embodiment, the cathode comprises a cathode active material selected from the group consisting of: inorganic insertion oxides, inorganic insertion sulfides, organosulfur compounds and conjugated polymers. In one embodiment, the cathode active material comprises elemental sulfur. In one embodiment, said cathode active material comprises an organo-sulfur compound; said organo-sulfur compound, in its oxidized state, comprising a polysulfide moiety, $—S_m—$, wherein m is an integer equal to or greater than 3.

In one embodiment, the battery cell further comprises a current collector for said anode, a separate current collector for said cathode and suitable encapsulation to prevent the penetration of air and moisture.

Another aspect of the present invention pertains to methods for making battery cells comprising electrically conducting crosslinked polymer films.

In one embodiment, said method for making a battery cell comprises:

(a) providing a lithium anode;

(b) providing a non-aqueous organic electrolyte containing a dissolved lithium salt;

(c) depositing an electrically conducting crosslinked polymer film interposed between the lithium anode and the electrolyte; said electrically conducting crosslinked polymer film being capable of transmitting lithium ions between the lithium anode and the electrolyte; and, (d) providing a cathode;

wherein said electrolyte is between the lithium anode and said cathode.

In one embodiment, said electrically conducting crosslinked polymer film is deposited by vacuum evaporation on said lithium anode. In one embodiment, the electrically conducting crosslinked polymer film is deposited by plasma-assisted vacuum evaporation. In one embodiment, said electrolyte is a polymer electrolyte containing a dissolved lithium salt. In one embodiment, the electrically conducting crosslinked polymer film is deposited by vacuum evaporation on said polymer electrolyte.

Another aspect of the present invention pertains to methods for making battery cells comprising lithium ion conducting polymer films.

In one embodiment, said method for making a battery cell comprises:

(a) proving a lithium anode;

(b) providing a non-aqueous organic electrolyte containing a dissolved lithium salt;

(c) depositing a lithium ion conducting polymer film interposed between the lithium anode and the electrolyte; said polymer film being doped electrically conductive and capable of transmitting lithium ions between the lithium anode and the electrolyte by incorporation of lithium ions, wherein said lithium ion-doped polymer film is capable of stabilizing the lithium anode against the formation of dendrites and has the capability to dissolve dendrites and further is capable of stabilizing the lithium anode against reaction with said electrolyte to form a more resistive interfacial layer; and, (d) providing a cathode;

wherein said electrolyte is between the lithium anode and said cathode.

In one embodiment, said lithium ion conducting polymer film is deposited by vacuum evaporation on said lithium anode. In one embodiment, the lithium ion conducting polymer film is deposited by plasma-assisted vacuum evaporation. In one embodiment, the electrolyte is a polymer electrolyte containing a dissolved lithium salt. In one embodiment, the lithium ion conducting polymer film is deposited by vacuum evaporation on said polymer electrolyte.

As a result of the present invention, rechargeable lithium-cells are provided having a higher energy density and longer cycle life than has previously been achieved.

For a better understanding of the present invention, reference is made to the following description and the accompanying drawings. The scope of the invention will be pointed out in the appended claims.

Li (3B), where SPE designates a Solid Polymer Electrolyte, and PPP designates an evaporated interfacial film where poly(p-phenylene) was the starting material for the evaporation.

FIG. 4 shows current-voltage effects on Li/SPE/Li (●) and Li/PPP/SPE/PPP/Li (○) cells as a function of time for 10 mV and 20 MV (4A) and 45 mV (4B).

Figure 5:
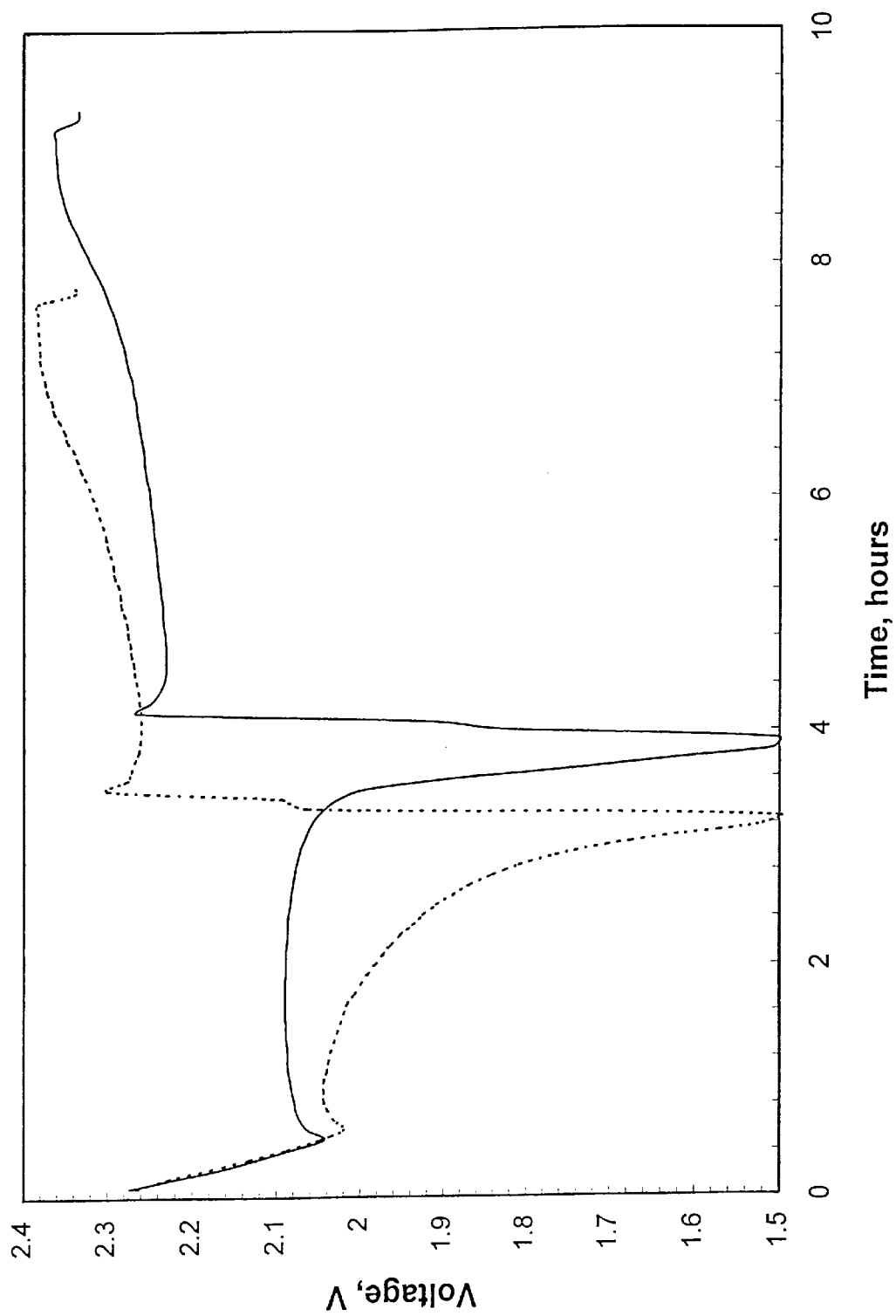

FIG. 5 shows the 29th discharge curve for AA wound cells of Example 3 with a PPP coated lithium anode (solid line) and an untreated lithium anode (dash line).

Figure 6:
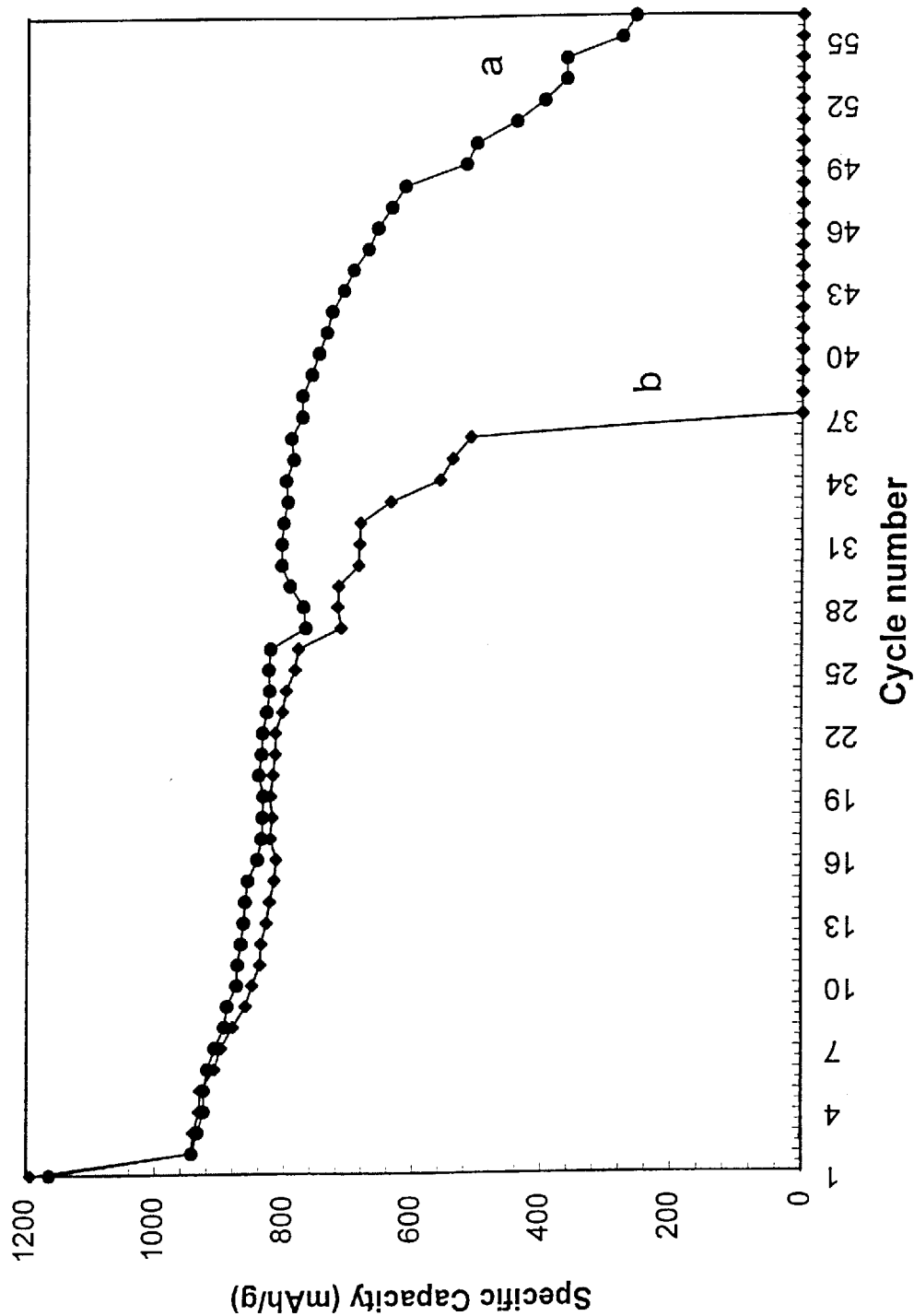

FIG. 6 shows the specific capacity versus cycle number for AA cells of Example 3 with a PPP coated lithium anode (●) and an untreated lithium anode (♦).

Figure 7:
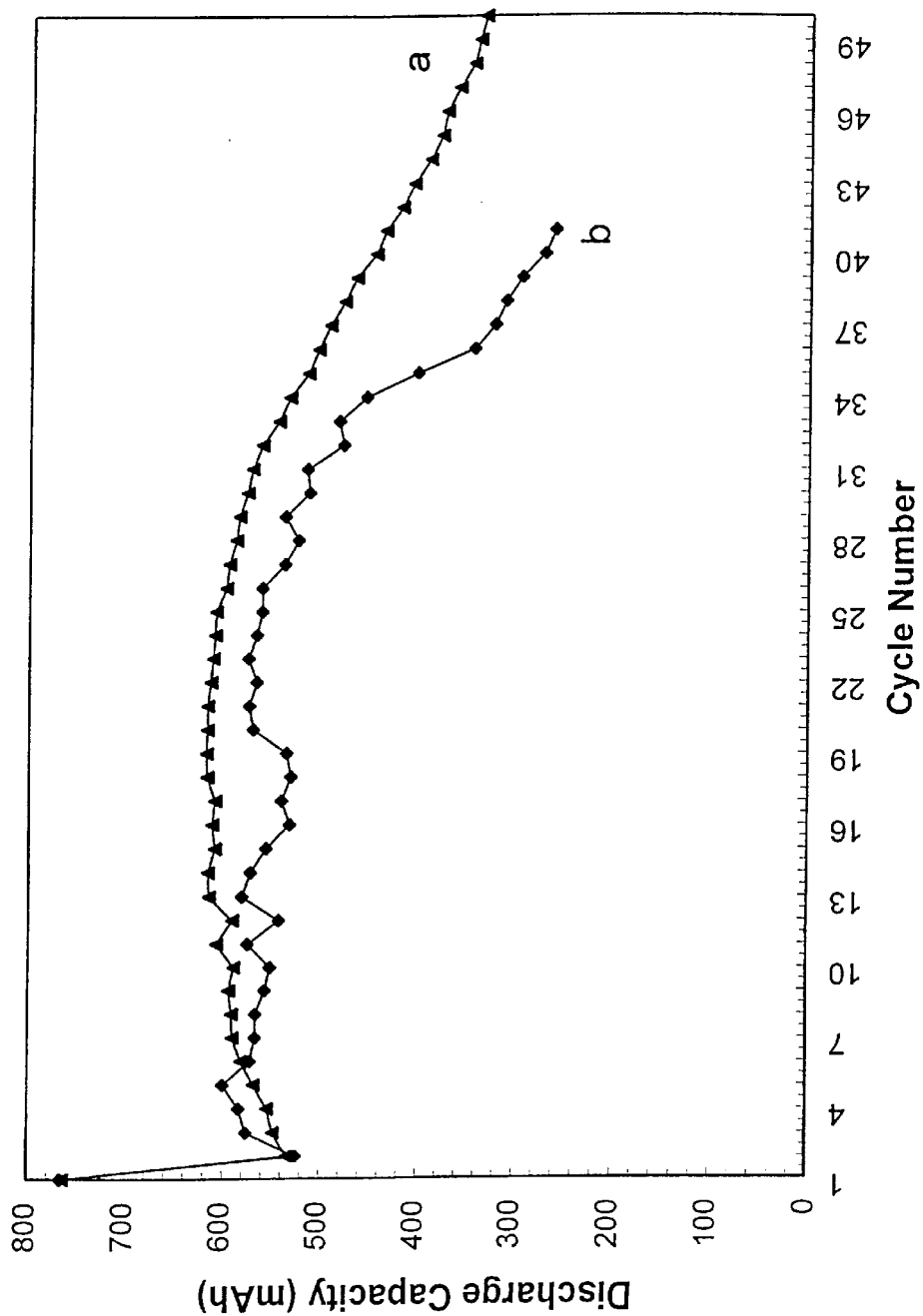

FIG. 7 shows the discharge capacity versus cycle number for AA cells with anodes treated with acetylene (▲) and for a control cells with untreated anodes (♦).

Figure 8:
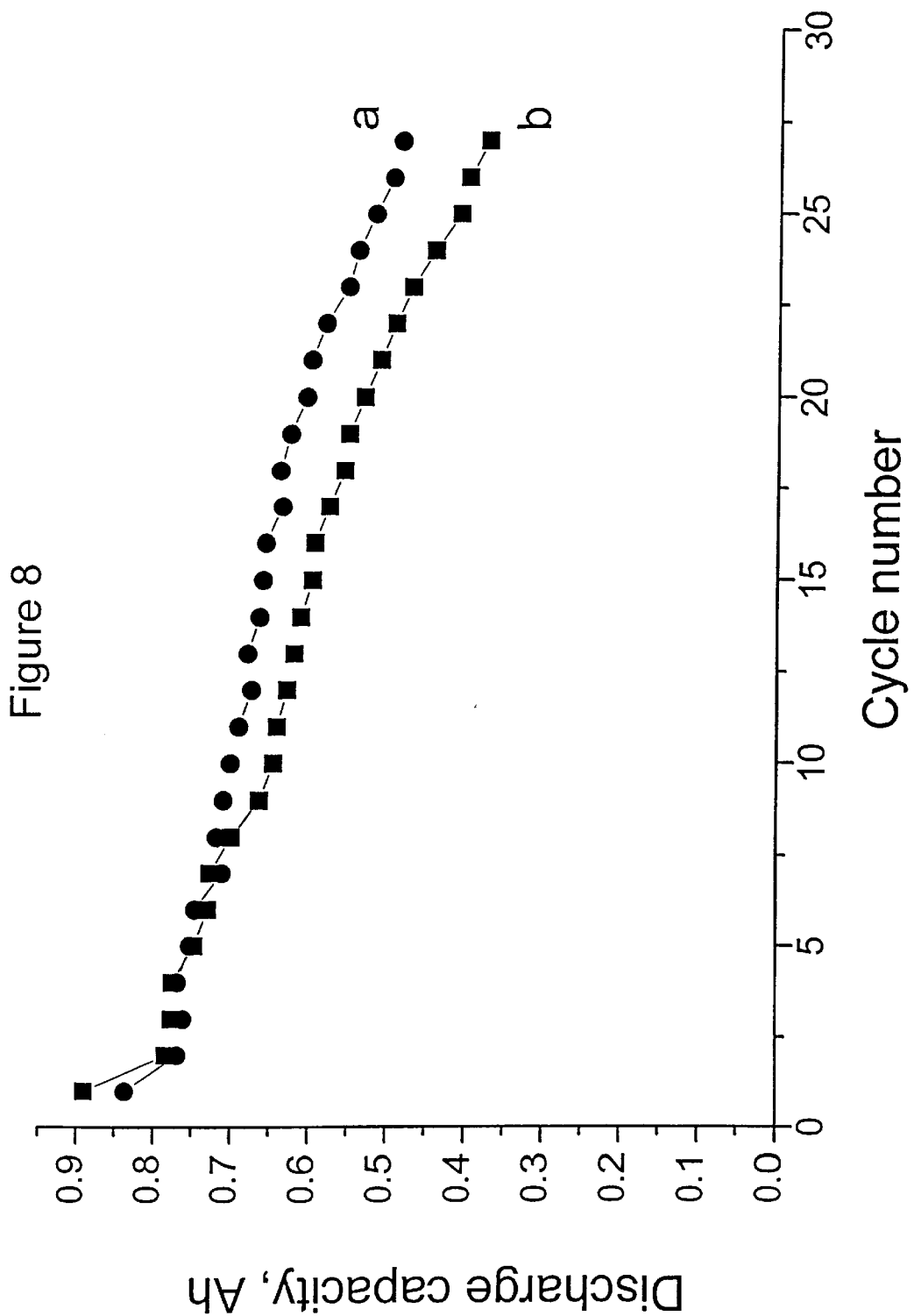

FIG. 8 shows the discharge capacity versus cycle number for AA cells with acetylene treated and untreated lithium anodes over 25 cycles.

Figure 9A:
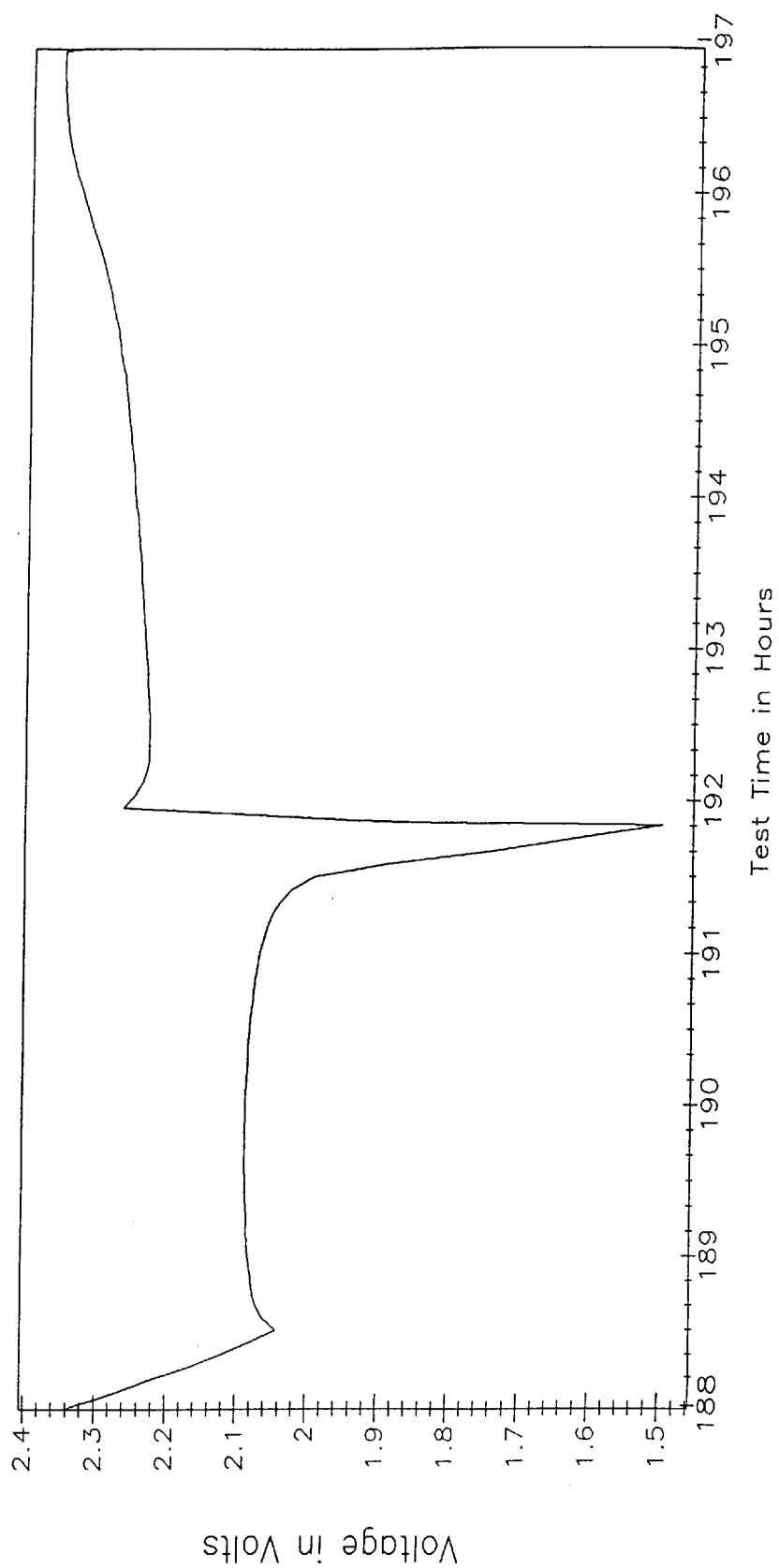
Figure 9B:
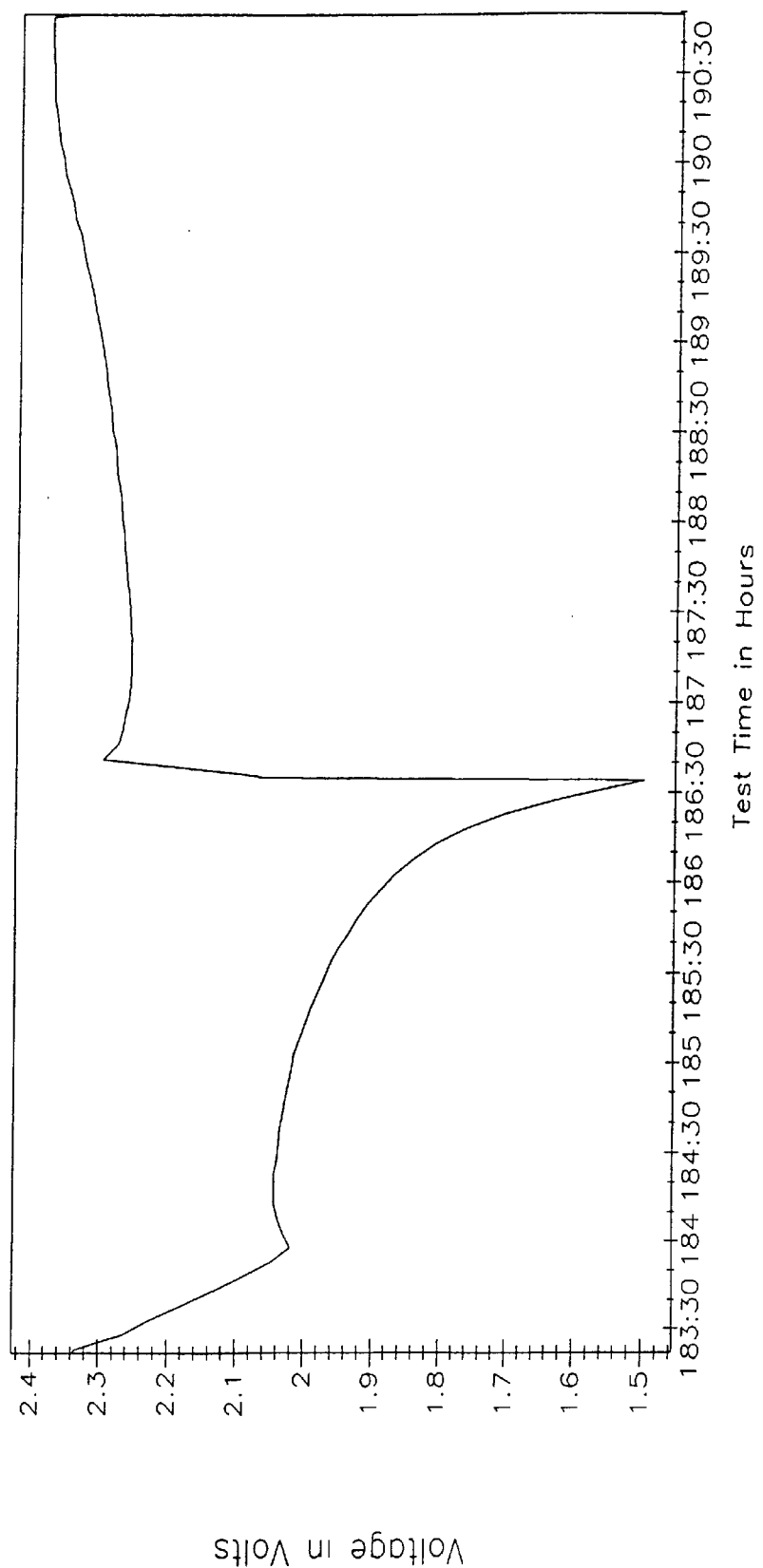

FIG. 9 shows the discharge curves for AA cells with acetylene treated (9A) and untreated (9B) anodes.

FIG. 10 show the infrared spectra of untreated (10A) lithium anodes and lithium anodes treated with acetylene gas (10B).

DETAILED DESCRIPTION OF THE INVENTION

The novel cell of this invention contains as an essential element a vacuum evaporated or chemically deposited polymer film interposed between a lithium metal anode and an electrolyte, where the polymer film has the capability to transmit lithium ions and to reduce the formation of dendrites on the lithium surface. The vacuum evaporated film is dense and provides complete surface coverage.

Certain conjugated polymers, such as polyacetylene and poly(p-phenylene), can be doped with lithium ions to be electrically conductive. In the form of thin films, the polymers have the ability to transmit lithium ions by diffusion as demonstrated by their electrochemical reversibility for lithium ion insertion and de-insertion. Thin films of the conjugated polymers can be doped by lithium ions by contacting them with lithium metal. The lithium metal converts to lithium ions which diffuse into the polymer structure up to a certain maximum concentration.

In the present invention, a thin film of a conjugated polymeric structure is placed at the interface between the lithium metal anode and the polymer electrolyte. With a bare lithium anode, the charge/discharge reaction at the anode of the cell is:

With the lithium electrode coated with a lithium ion transmitting polymer layer, the charge/discharge reaction becomes:

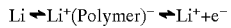

Charging and discharging reactions at a bare lithium surface in an organic electrolyte, leads to irreversible changes of the lithium surface. Upon stripping of lithium metal into lithium ions in the electrolyte, the dissolution occurs non-uniformly across the surface, leading to a roughening of the surface. Upon re-deposition of lithium ions onto the lithium metal surface, the plating does not occur uniformly but preferentially at the protruding points on the surface, leading ultimately to the formation of dendrites and a shorting of the cell. Some dendritic material will be encapsulated and no longer accessible for cycling, requiring an excess of lithium. The high surface area of the lithium that results from the dendritic growth and subsequent encapsulation poses severe safety hazards.

When the lithium surface is coated with an evaporated or deposited lithium ion conducting polymer film, the film is doped by conversion of lithium into lithium ions which diffuse into the film until a maximum concentration is reached. This renders the polymer film electrically conducting and capable of transmitting lithium ions between the lithium metal anode and the electrolyte. During the discharge process, lithium ions will enter the electrolyte from the polymer film and lithium metal ions will dissolve into the polymer film at the lithium-polymer interface. The lithium-doped polymer film provides a constant potential across the lithium metal surface due to its high electrical conductivity, thereby providing thermodynamically more favorable stripping conditions without pitting of the electrode surface. In addition, the polymer film has the ability to dissolve micro-dendrites as they are formed.

Similarly, during the plating of lithium from the electrolyte, the plating takes place solely at the lithium-conducting polymer interface where a uniform potential is maintained. Therefore, no preferential deposition occurs at protruding areas of the lithium surface.

The ability to prevent the formation of dendrites that can electrically short the cell, allows the fabrication of cells with thinner polymer electrolyte films. This provides cells with higher capacity for energy storage by weight and volume.

Figure 1:
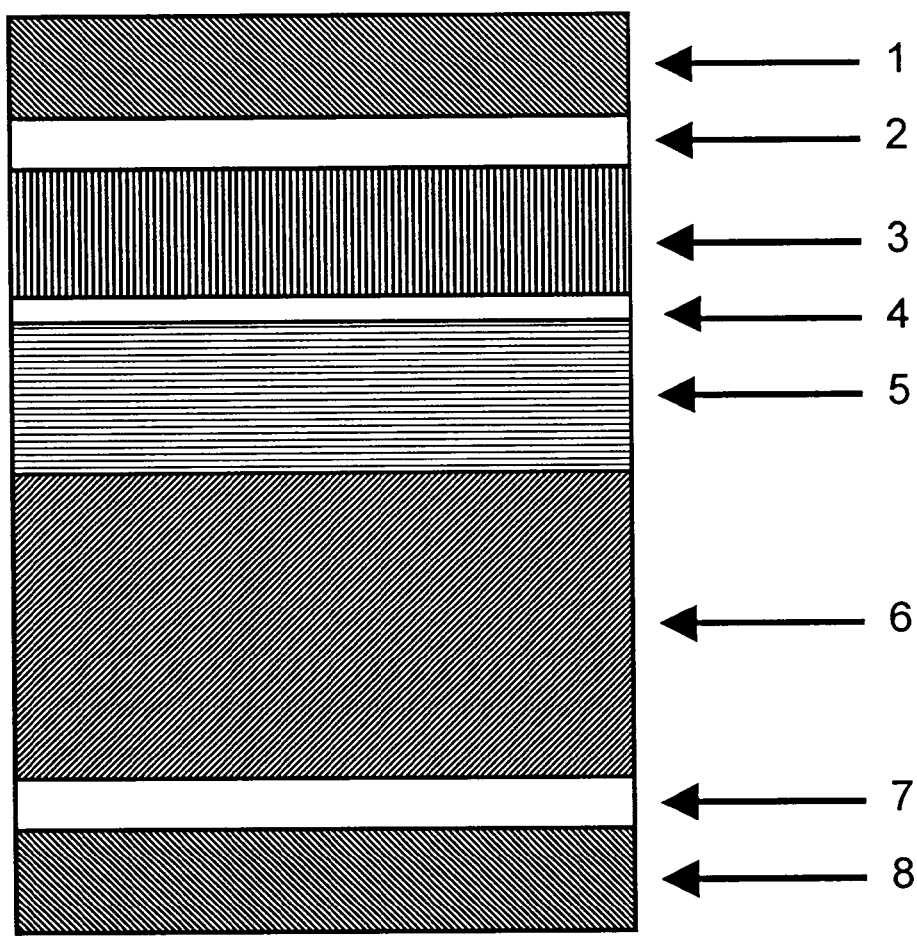
FIG. 1 shows a schematic structure of a cell incorporating a lithium-ion conducting film interposed between the lithium metal anode and the polymer electrolyte.

FIG. 1 shows schematically the structure of a cell incorporating an electrically conducting film capable of transmitting lithium ions interposed between the lithium metal anode and the electrolyte. The thickness of the electroconducting film is from 0.01 μm to 10 μm, with the preferred thickness being from 0.1 μm to 5 μm.

Evaporation in a vacuum is the preferred method of deposition of the electroconductive film. Vacuum deposition provides dense films and complete surface coverage. If the vacuum deposition uses low molecular weight monomeric or oligomeric materials as evaporation sources, the evaporation may be performed through a plasma which polymerizes the monomers or oligomers to provide an insoluble film on the lithium surface.

The electroconductive film may be evaporated onto the lithium surface followed by lamination of the polymer coated anode with the polymer electrolyte, or deposition of the polymer electrolyte onto the electroconductive film by other means, such as extrusion. Alternatively, the electroconductive film may be evaporated onto the polymer electrolyte, followed by subsequent lamination with a lithium foil electrode, or thermal evaporation of the lithium electrode onto the electroconductive film in a vacuum.

Useful starting polymers, for the formation of the electroconductive polymer film may be any conjugated structure which is capable of being doped electrically conductive by lithium ions, such as poly(p-phenylene), polyacetylene, poly (phenylene vinylene), polyazulene, poly(perinaphthalene), polyacenes, and poly(naphthalene-2,6-diyl). This list of polymers is illustrative and not intended to be exhaustive. Amongst these illustrative conjugated polymers, poly(p-phenylene) is preferred.

Figure 2A:
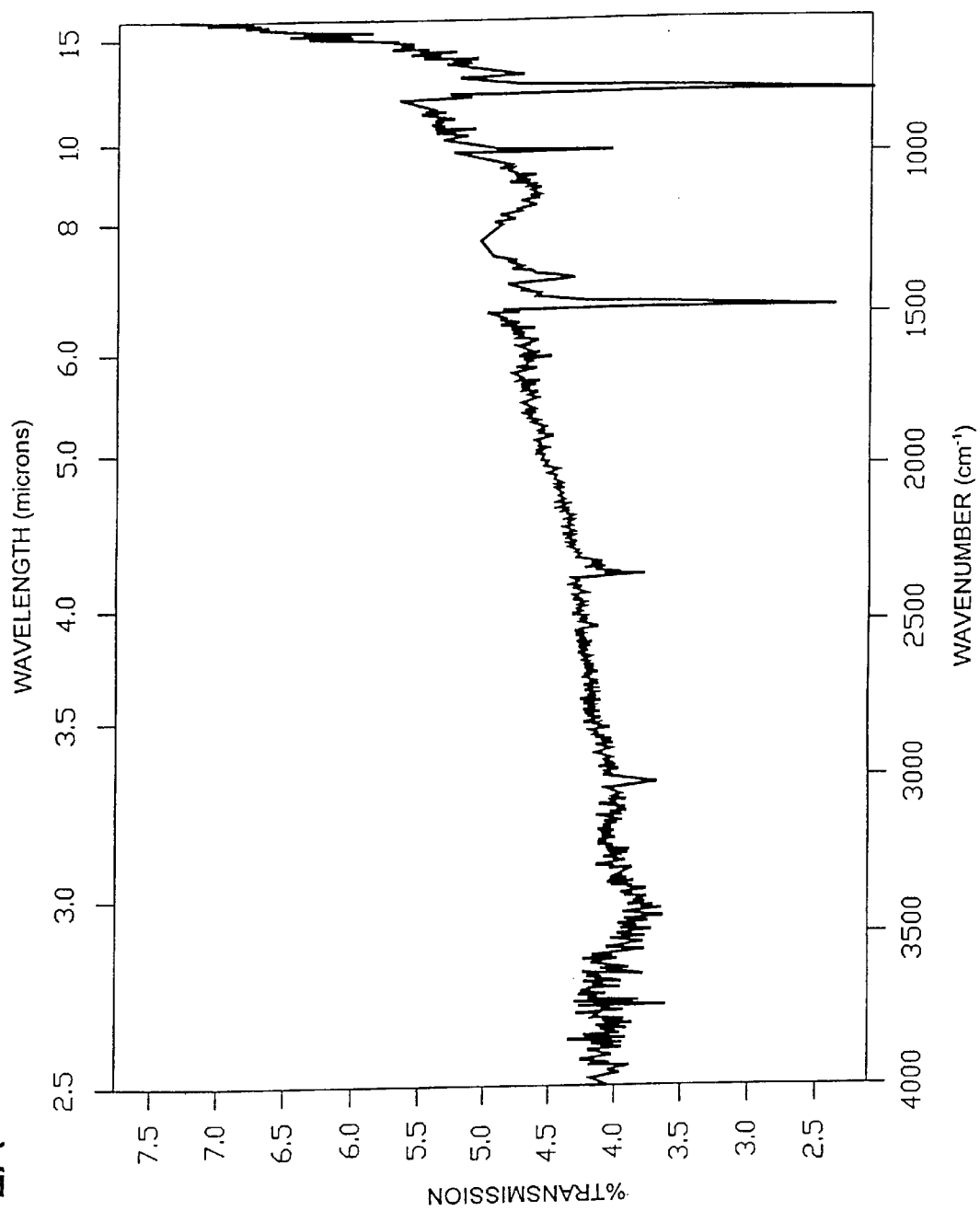
FIG. 2 shows infrared (IR) spectra of poly(p-phenylene) powder in KBr (2A) and a PPP film evaporated onto a silicon wafer (2B).
Figure 2B:
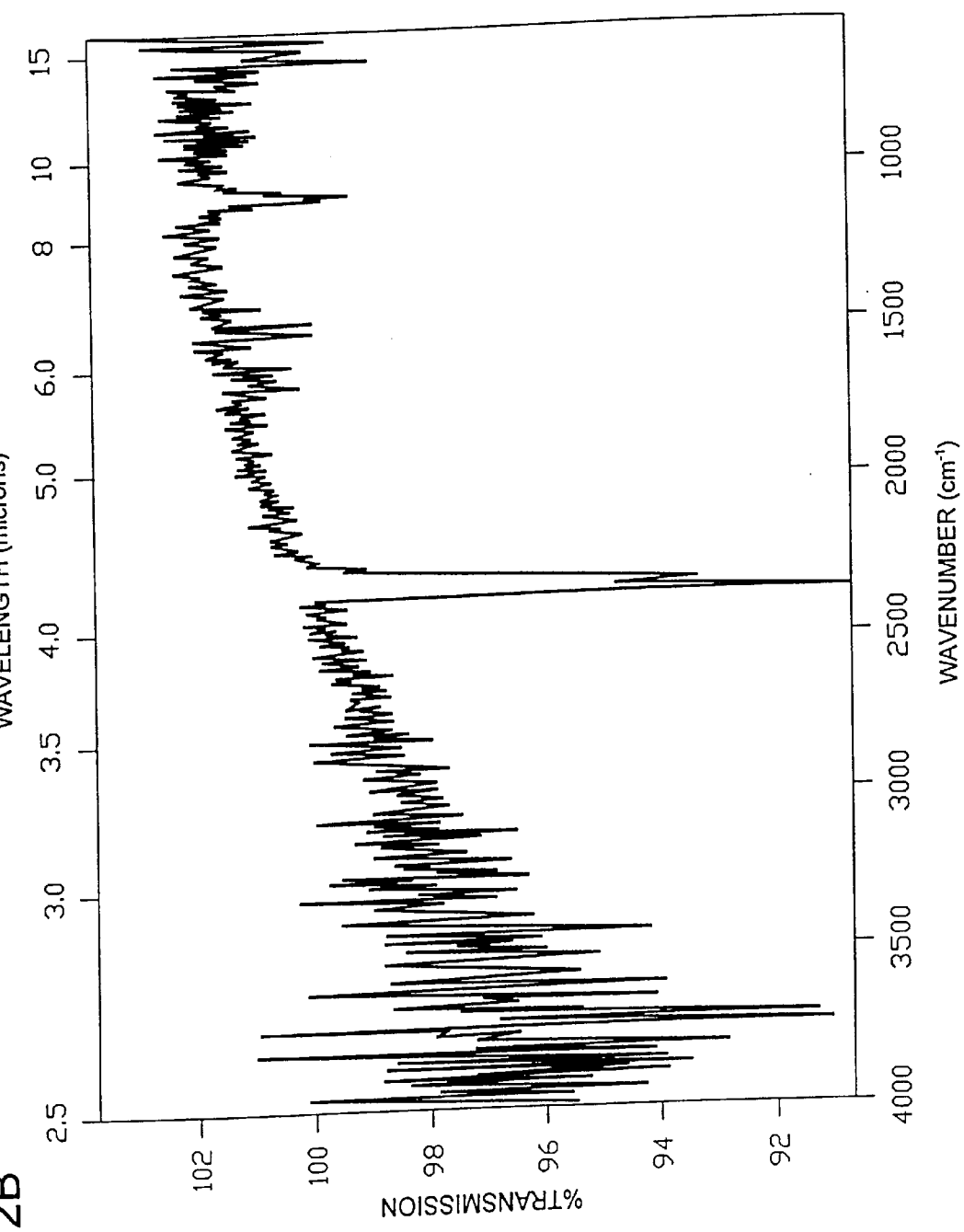

When the polymer film is deposited by vacuum evaporation, the resulting polymer may have a structure which is different from the starting material. FIG. 2 shows the IR spectrum of a poly(p-phenylene) film mixed in powder form in a KBr pellet (2A) compared with the IR spectrum (2B) of a 0.1 μm film deposited on a silicon wafer by thermal vacuum evaporation using poly(p-phenylene) as the starting material. The starting polymer is decomposed thermally during the evaporation process. The polymer decomposition leads to formation of highly reactive fragments of lower molecular weight. Polymerization occurs by recombination of these reactive fragments on the substrate surface. The deposited film is not poly(p-phenylene), as can be clearly seen from the IR spectra, but a highly crosslinked and branched electroconductive polymer film which can be doped with lithium ions. Vacuum deposition of electroconductive films using conjugated polymers as starting materials have been disclosed by Yamamoto et al., *J Physical Chemistry*, 1992, 96, 8677.

Similarly, films may be produced by using oligomers of varying molecular weight as starting material. If crosslinked, insoluble films are desired, the oligomer vacuum evaporation may be performed through a plasma which generates reactive groups that lead to polymerization on the substrate surface.

Another approach to the formation of highly reactive fragments of low molecular weight is to use highly reactive, low molecular weight monomeric materials as the source of vapors. As used herein by the word "vapor" is meant a substance in the gaseous state. Such a source may be a gas phase monomer, an example of which is acetylene. In the case of gaseous low molecular weight monomers, evaporation of the source material is not necessary, as the gas may be introduced directly into the deposition chamber. Formation of anode stabilizing films on the anode surface are initiated by the interaction of the reactive monomer with the lithium surface. The reactive groups that form lead to the formation of an anode stabilizing film. When the anode stabilizing film is deposited in this way, it may have a structure which is different from the monomeric starting material. Also, it may provide an anode stabilizing film that is insoluble in the electrolyte during the charge-discharge cycling of the electrochemical cell.

The use of gas phase, low molecular weight monomeric materials as vapor sources results in the need for simpler apparatus to perform the evaporation and deposition. Film formation, as illustrated in Examples 4, 5, 6 and 7, was made by placing the lithium anode in an evacuable chamber, then exposing the lithium anode surface to the monomeric species. In these examples, this monomer was acetylene. A reaction temperature from room temperature to 100° C. or greater may be used for formation of an anode stabilizing film.

Thin films are formed by treatment with a monomer. The thickness of films formed on the substrate are estimated to be in the range of 0.01 μm to 0.1 μm. Evidence for the formation of an anode stabilizing film is obtained from infrared spectral measurements, as illustrated in FIG. 10 and described in Example 7. These infrared spectra reveal the formation of a surface film that is chemically different from that of the low molecular weight monomeric starting material.

Useful low molecular weight monomeric and oligomeric materials include acetylene and oligomers of poly(p-phenylene), polyacetylene, poly(phenylene vinylene), polyazulene, poly(perinaphthalene), polyacenes, and poly (naphthalene-2,6-diyl).

Electrolytes useful in the practice of this invention may be any liquid, solid, or solid-like material capable of storing and transporting ions, so long as the material is chemically inert with respect to the anode and the cathode, and the material facilitates the transportation of ions between the anode and the cathode. In the special case of solid electrolytes these materials may additionally function as separators between the anodes and cathodes.

The electrolyte may be a thin film of a solid polymer electrolyte, such as an amorphous polyether, a branched polysiloxane with ethylene oxide side chains or a branched polyphosphazene with ethylene oxide side chains, into which is dissolved a lithium salt.

Additional examples of useful solid polymer electrolyte materials comprise polyethylene oxide (PEO), polyimides, polyphosphazenes, polyacrylonitriles (PAN), polysiloxanes, derivatives of the foregoing, copolymers of the foregoing, crosslinked and network structures of the foregoing, blends of the foregoing, and the like to which is added an appropriate electrolyte salt.

The conductivity of the polymer electrolyte may be enhanced by the addition of plasticizing compounds of low molecular weight, such as propylene carbonate, ethylene carbonate, N-methyl acetamide, sulfonate, sulfolane, 1,2-dimethoxyethane, poly(ethylene glycols), 1,3-dioxolane and glymes. Plasticized polymer electrolytes are also known as gel polymer electrolytes.

Further examples of useful plasticizing agents for polymer electrolytes include acetonitrile, tetraethyleneglycol dimethyl ether (TEGDME), siloxanes, and ethylene oxide grafted siloxanes, and blends thereof. Particularly preferred plasticizing agents are those derived from graft copolymers of ethylene oxide and oligomers of poly(dimethyl siloxane) of general formula I, as described in U.S. Pat. No. 5,362,493

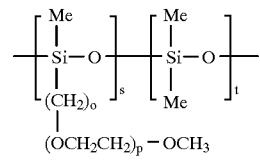

I wherein o is an integer equal to or greater than 1; p is an integer equal to or greater than 0 and less than about 30; and, the ratio t/s is equal to or greater than 0. Values for o, p, s, and t can vary widely and depend on the desired properties for said liquid or plasticizing agent. Preferred agents of this type are those wherein o ranges from about 1 to 5, p ranges from about 1 to 20, and the ratio t/s is equal to or greater than 0.5. An especially preferred composition of formula I is that in which o is equal to 3, p is equal to 7, and the ratio of t to s is 1.

Additional polymer matrixes for gel electrolytes may be derived from polypropylene oxides, sulfonated polyimides, perfluorinated membranes (Nafion™ resins), divinyl polyethylene glycols, polyethylene glycol-bis-(methyl acrylates), polyethylene glycol-bis(methyl methacrylates), derivatives of the foregoing, copolymers of the foregoing, crosslinked and network structures of the foregoing, blends of the foregoing, and the like.

The polymer electrolyte may be an exclusive cation conducting polymer electrolyte, a so-called single-ion conductor, wherein the anionic charges are covalently attached to the polymer backbone. The conductivity of the single-ion conducting polymer electrolytes may be enhanced by the addition of plasticizing compounds. The preferred thickness of the polymer electrolyte is from 1 μm to 50 μm, mostly preferably from 1 μm to 25 μm.

Useful lithium salts are $LiCF_3SO_3$, $LiClO_4$, $LiAsF_6$, $LiN(SO_2CF_3)_2$, $LiC(SO_2CF_3)_3$ and lithium salts of fluorosulfonated phenols and pyrroles. Further examples of useful electrolyte salts are, $LiSO_3CH_3$, $LiBF_4$, $LiB(Ph)_4$, $LiPF_6$, $LiC(SO_2CF_3)_3$, and

$LiNSO_2CF_2CF_2CF_2CF_2SO_2$.

Other electrolyte salts useful in the practice of this invention are disclosed in U.S. Pat. No. 5,538,812.

These liquid or plasticizing compounds themselves, and blends thereof, are useful solvents to form liquid electrolytes which provide other effective electrolyte systems for the cells of the present invention. For example, glymes or sulfolane with lithium salts, such as $LiAsF_6$, are useful liquid electrolytes. 1,3-Dioxolane and TEGDME are especially useful as a blend of solvents for liquid electrolytes. Likewise, compositions of TEGDME or of formula I together with $LiSO_3CF_3$ are especially useful as liquid electrolytes.

Suitable cathode active materials can be selected from the group of inorganic insertion oxides and sulfides, organosulfur compounds and conjugated polymers. Useful inorganic insertion oxides include $CoO_2$, $NiO_2$, $MnO_2$, $MN_2O_4$, $V_6O_{13}$ and $V_2O_5$. Useful organic sulfides include $TiS_2$ and $MoS_2$. Useful organo-sulfur materials include polymerization/depolymerization compounds as disclosed in U.S. Pat. No. 4,833,048 and polymers such as poly (carbon disulfide). Suitable conjugated polymers include polyacetylene, poly(phenylene vinylene) and polyaniline.

Further useful cathode active materials in the practice of this invention are organo-sulfur materials comprising carbon-sulfur polymer materials as described in U.S. Pat. No. 5,441,831. Still further useful organo-sulfur materials are described in U.S. Pat. Nos. 5,601,947 and 5,529,860 and U.S. patent application Ser. Nos. 08/729,713 and 08/602,323. Sulfur containing cathode active organic materials as described in these disclosures comprise, in their oxidized state, a polysulfide moiety of the formula, $—S_m—$, wherein m is an integer equal to or greater than 3. Further useful cathode compositions comprising organo-sulfur and elemental sulfur cathode active materials are described in U.S. Provisional Application No. 60/018,115.

Cathodes of the present invention may further comprise one or more materials selected from the group of binders, electrolytes, and conductive additives, usually to improve or simplify their fabrication as well as improve their electrical and electrochemical characteristics.

Typically, the cathode is a composite material consisting of cathode active material (40–70%), polymer electrolyte for ionic conductivity (20–50%) and carbon black for electronic conductivity (5–20%). The composite cathode may also contain a small fraction (1–5%) of a binder, for example teflon, for mechanical stability.

The choice of binder material may vary widely so long as it is inert with respect to the composite cathode materials. Useful binders are those materials, usually polymeric, that allow for ease of processing of battery electrode composites and are generally known to those skilled in the art of electrode fabrication. Examples of useful binders are organic polymers such as polytetrafluoroethylenes (Teflon®), polyvinylidine fluorides ($PVF_2$ or PVDF), ethylene-propylene-diene (EPDM) rubbers, polyethylene oxides (PEO), UV curable acrylates, UV curable methacrylates, and UV curable divinylethers, and the like.

Useful conductive additives are those known to one skilled in the art of electrode fabrication and are such that they provide electrical connectivity to the majority of the electroactive materials in the composite cathode. Examples of useful conductive fillers include conductive carbons (e.g., carbon black), graphites, metal flakes, metal powders, electrically conductive polymers, and the like.

Examples of useful electrolytes include any liquid, solid, or solid-like materials capable of storing and transporting ions, so long as the electrolyte material is chemically inert with respect to the composite cathode material and the electrolyte material facilitates the transportation of ions.

In those cases where binder and conductive filler are desired, the amounts of binder and conductive filler can vary widely and the amounts present will depend on the desired performance. Typically, when binders and conductive fillers are used, the amount of binder will vary greatly, but will generally be less than about 15 wt % of the composite cathode. Preferred amounts are less than 10 wt %. The amount of conductive filler used will also vary greatly and will typically be less than 15 wt % of the composite cathode. Preferred amounts of conductive additives are generally less than 12 wt %.

EXAMPLES

Several embodiments of the present invention are described in the following examples, which are offered by way of illustration and not by way of limitation.

Example 1

Interface Stability Studied by ac Impedance Spectroscopy

Figure 3A:
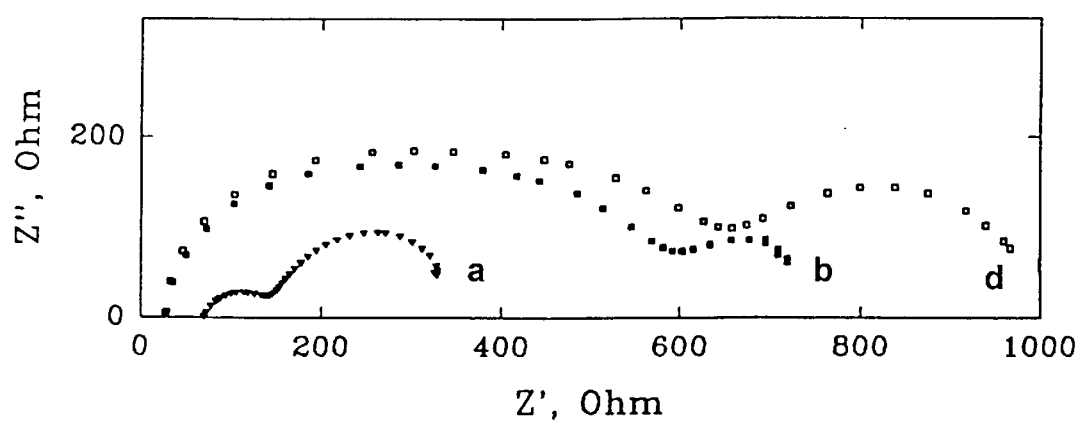
FIG. 3 shows ac impedance spectra as a function of time for symmetrical cells Li/SPE/Li (3A) and Li/PPP/SPE/PPP/
Figure 3B:
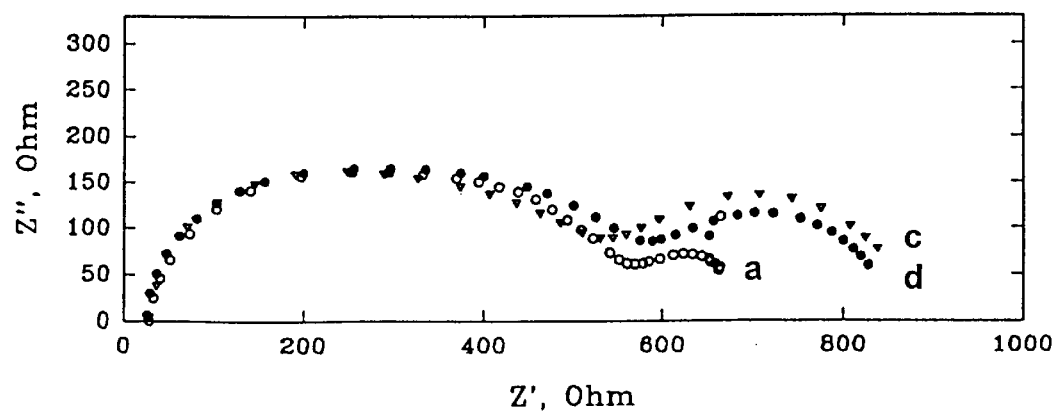

A 0.1 micron film of PPP was deposited by thermal vacuum evaporation onto two lithium foils using poly(p-phenylene) as the starting material. The vacuum chamber was placed inside an argon atmosphere glove box. The residual pressure in the chamber was 0.01–0.02 torr and the evaporation temperature 300–350 deg. C. Symmetrical cells of the construction Li/SPE/Li and Li/PPP/SPE/PPP/Li were constructed, where SPE designates solid polymer electrolyte and PPP is the resulting film deposited by thermal evaporation of poly(p-phenylene). The SPE consisted of a 25 micron thick CELGARD™ 2500 (Hoechst Celanese Corporation) membrane soaked in a liquid branched polysiloxane with $LiCF_3SO_2$ salt, where the Li/O ratio was 1/24. FIG. 3 shows the ac impedance spectra of the two symmetrical cells as a function of time. The time evolution of the ac impedance spectrum of the Li/SPE/Li cell (3A) shows a lack of stabilization even after long times. This implies a continuing chemical reaction between the lithium electrode and the polymer electrolyte resulting in the build-up of a highly resistive interfacial layer. With the PPP interfacial film (3B) the ac impedance spectra show an initial increase in the interfacial resistance at short times followed by stabilization.

Example 2

Interfacial Stability Studied by Current-voltage Characteristics

Figure 4A:
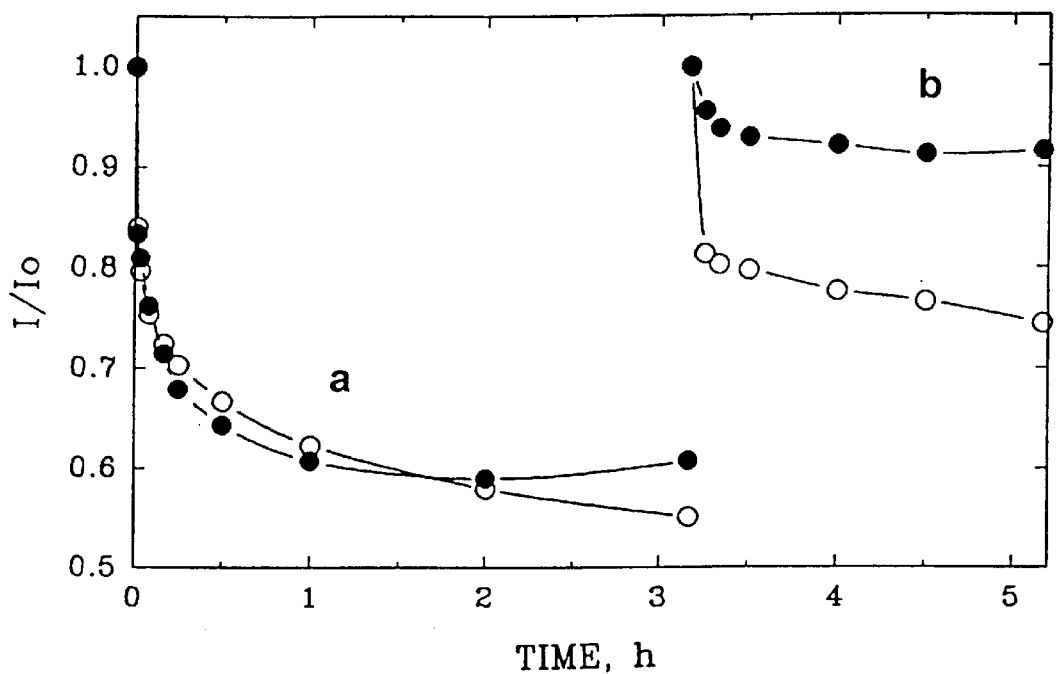
Figure 4B:
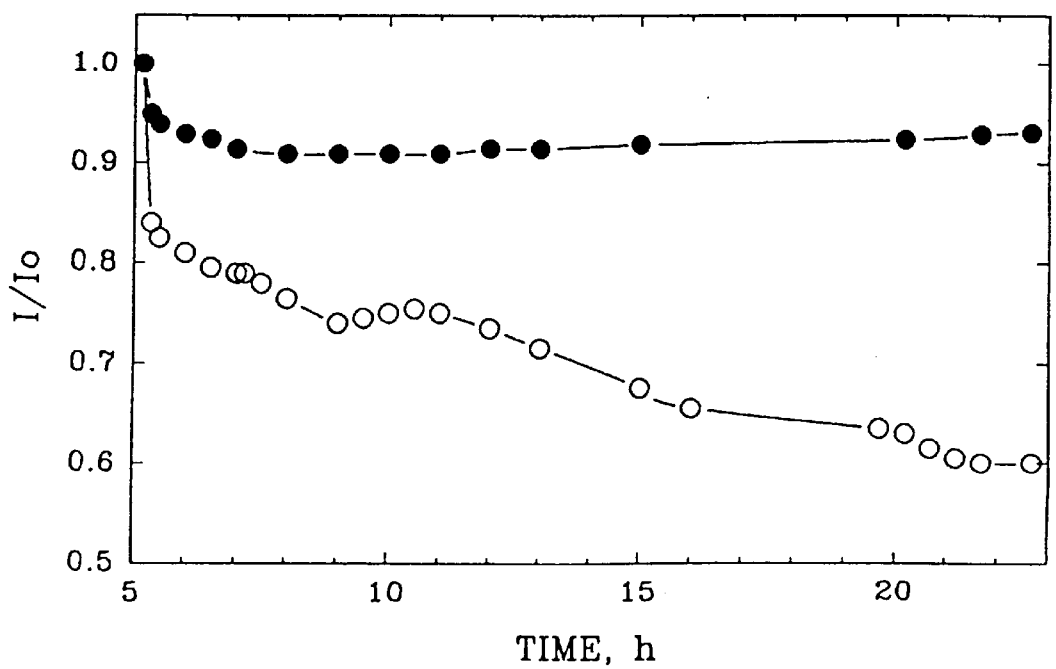

Symmetrical cells were constructed as in Example 1. The stability of the lithium-SPE and the lithium-PPP-SPE interfaces was studied under conditions of direct current passing through the interface. Constant potentials were maintained across the cells and the currents were monitored. Voltages of 10 mV, 20 mV and 45 mV were used. The results are shown in FIGS. 4A and 4B. The current passing through the Li/SPE/Li cell continues to drop for the duration of the experiment, whereas the current passing through the Li/PPP/SPE/PPP/Li cell levels off after an initial decay. A continuous decrease in the current with time with constant potential implies that the interfacial resistance increases.

Example 3

Thin films of conjugated polymeric PPP of thickness of 0.07 μm were deposited on 4 mil lithium anodes with pre-welded tabs using poly(p-phenylene) powder as the evaporation source. Deposition was performed using a Westinghouse vacuum system (residual pressure $10^{-5}$ torr) with a rotating substrate holder. Temperature was controlled by current and voltage. Deposition was performed until a pre-specified reading of the thickness monitor corresponding to 0.07 μm (700 Å).

Standard wound AA size cells were assembled in a dry room using PPP coated and uncoated (control) lithium anodes, a TONEN™ (Tonen Chemical Corporation) separator, and a paste cathode with a composition of 60 wt % sulfur, 30 wt % carbon conductive material, 5% silica and 5 wt % TEFILON™ (PTFE-K30, DuPont). The assembled cells were filled with a liquid electrolyte consisting of 50% 1,3-dioxolane, 20% diglyme, 10% sulfolane, 20% dimethoxyethane by volume and 1.0 mol/L lithium triflate salt. The cells were cycled at a rate of discharge and charge of about 0.67 and 0.3 mA/cm$^2$, respectively.

The discharge curves for cells with PPP coated anodes demonstrate a higher voltage plateau than for control cells with uncoated anodes. At the 29$^{th}$ discharge cycle, the discharge curves for cells with treated and untreated anodes are shown in FIG. 5. The discharge for the cell with a treated anode has a flat plateau located above 2.0 mV, whereas the control cell shows lower voltage plateau, that is also more steeply falling. FIG. 6 shows the specific capacity versus cycle number for cells with PPP coated lithium anodes (●) and an untreated lithium anodes (◆). After the 26 cycles the cells were stored in the discharged state for two days, then charge and stored for 20 hours before cycling was resumed. Although capacity was lost for both control and treated cells, the capacity of cells with PPP coated anodes was almost completely recovered after 4–5 cycles, whereas the control cells began to fail. These data show the ability of the PPP film to stabilize the lithium anode in cycled cells.

Example 4

Interfacial films on the lithium surface were formed by exposing the lithium surface to acetylene gas, a low molecular weight, monomeric source of vapors. Pre-cut, rolled 4 mil lithium anodes with attached tabs were placed in an evacuable glass chamber and the chamber was evacuated prior to introduction of acetylene gas. Acetylene gas was purified by passing it through a low temperature trap, followed by freeze-pump-thawing. The lithium anodes were treated with acetylene at a pressure of 1 atm at 100° C. for one hour. The residual gas was then pumped from the glass chamber prior to assembly of the anodes into cells.

Wound AA size cells were assembled in a dry room with either treated or untreated lithium anodes and a TONEN™ (Tonen Chemical Corporation) separator. The cathode used was a paste cathode produced by standard Rondo techniques with a formulation of 60 wt % sulfur, 30 wt % carbon conductive material, 5% silica and 5 wt % TEFLON™ (PTFE-K30, DuPont) binder on an expanded metal stainless steel current collector. Cathodes had an overal thickness of 180–190 μm. The cells were filled with an liquid electrolyte consisting of 50% 1,3-dioxolane, 20% diglyme, 10% sulfolane, 20% dimethoxyethane by volume and 1.0 mol/L lithium triflate salt.

The cells were cycled at a rate of charge and discharge of approximately 0.3 mA/cm$^2$ and 0.67 mA/cm$^2$, respectively. FIG. 7 shows data for typical AA cells with treated anodes (▲) and for a untreated control anodes (◆). Data for treated anodes is for an average of 4 cells, whereas the control data is for 1 cell, as all remaining control cells died after only 10 cycles. It is evident from these data, that the gas treatment of the anode has a significant effect on the cycle life and performance of the cells.

The safety behavior of cells were also studied using the hot box test (1 hour at 130° C.), after the first 5 cycles were completed. Where as the control cells tested failed the safety test by venting with fire, a cell with an acetylene treated anode passed the safety test by venting with fire.

Example 5

Wound AA cells were assembled using paste cathodes as described in Example 4, a liquid electrolyte consisting of 50 wt % 1,3-dioxolane, 45 wt % dimethoxyethane and 5 wt % o-xylene with 1.3 mol/L lithium triflate electrolyte salt, and 3 mil lithium anodes. Treated lithium anodes were prepared by first removing the pristine oxide layer by brushing the surface of the foil with soft paper tissue in an argon filled glove box. The foil was then treated with acetylene gas as the low molecular monomeric vapor source material at 110° C. for 1 hour. Cells were assembled in a dry room. Cells were cycled at a discharage and charge rate of 0.5 mA/cm$^2$ and 4.5 mA/cm$^2$, respectively. Control cells were assembled from untreated anodes.

Data for cells with treated and untreated lithium anodes over 25 cycles is shown in FIG. 8. These data show that, although during the first 7 or so cycles there is little difference in the performance of the control and treated anode cells, after longer cycling the capacity and rate of capacity fade is higher for untreated anodes than for those that were treated. This is even more evident if the discharge curves are compared for cells with treated (9A) and untreated (9B) anodes, as shown in FIG. 9. Gas treatment of the lithium anode results in a higher and flatter plateau, than for cells with untreated anodes. This correlates to a 5% increased accumulated specific energy at the same accumulated specific capacity for treated cells compared to control cells.

Example 6

Standard coin cells were assembled from cathodes made from a slurry composition of 55 wt % sulfur, 25 wt % vanadium oxide, 10 wt % carbon conductive material and 10 wt % polyethylene oxide deposited on a nickel foil current collector cathode, a CELGARD™ 2500 (Hoechst Celanese Corporation) separator and 7 mil lithium foil anodes in an argon filled glove box. The cells were filled with an liquid electrolyte consisting of 50% 1,3-dioxlane and 50% tetraglyme (by volume) with 1.0 mol/L lithium triflate salt. Prior to cell assembly the treated lithium anodes were prepared by exposing lithium foil to acetylene gas ($P_{acetylene}$=0.7–1.0 atm) at room temperature overnight.

Treated and control cells were cycled at 0.5 mA/cm$^2$. During the first 50 cycles, the cells with treated anodes demonstrated slightly increased discharge capacity and a pronounceable lower capacity fade. More significant differences were observed between the treated and control cells after storage at room temperature. After three weeks' storage, the control cells were completely dead, whereas for cells with treated anodes only 15% of the initial capacity was irreversibly lost. Storage for a shorter time period of five days resulted in the observation that treated cells conserved 30% of their capacity prior to storage, and completely recovered their capacity in the second post storage cycle. Control cells on the other hand, after 5 days storage at room temperature, were completely self discharged, recovering most of their capacity only after 4–5 post storage cycles.

Example 7

The infrared spectra of lithium foil (4 mil) before (control) and after deposition of an interfacial film formed were measured by FTIR spectroscopy using a HATR accessory in the range 600–7000 cm$^{-1}$. A treated lithium surface was formed using acetylene gas as the low molecular weight, monomeric vapor source material, by exposure of the lithium foil to purified acetylene gas at a pressure of 1 atm for 1 hour at 100° C. as described above. Prior to measurement of the IR spectrum, acetylene was evaporated from the deposition chamber, and the sample was transferred in a dry box to the HATR accessory.

Figure 10A:
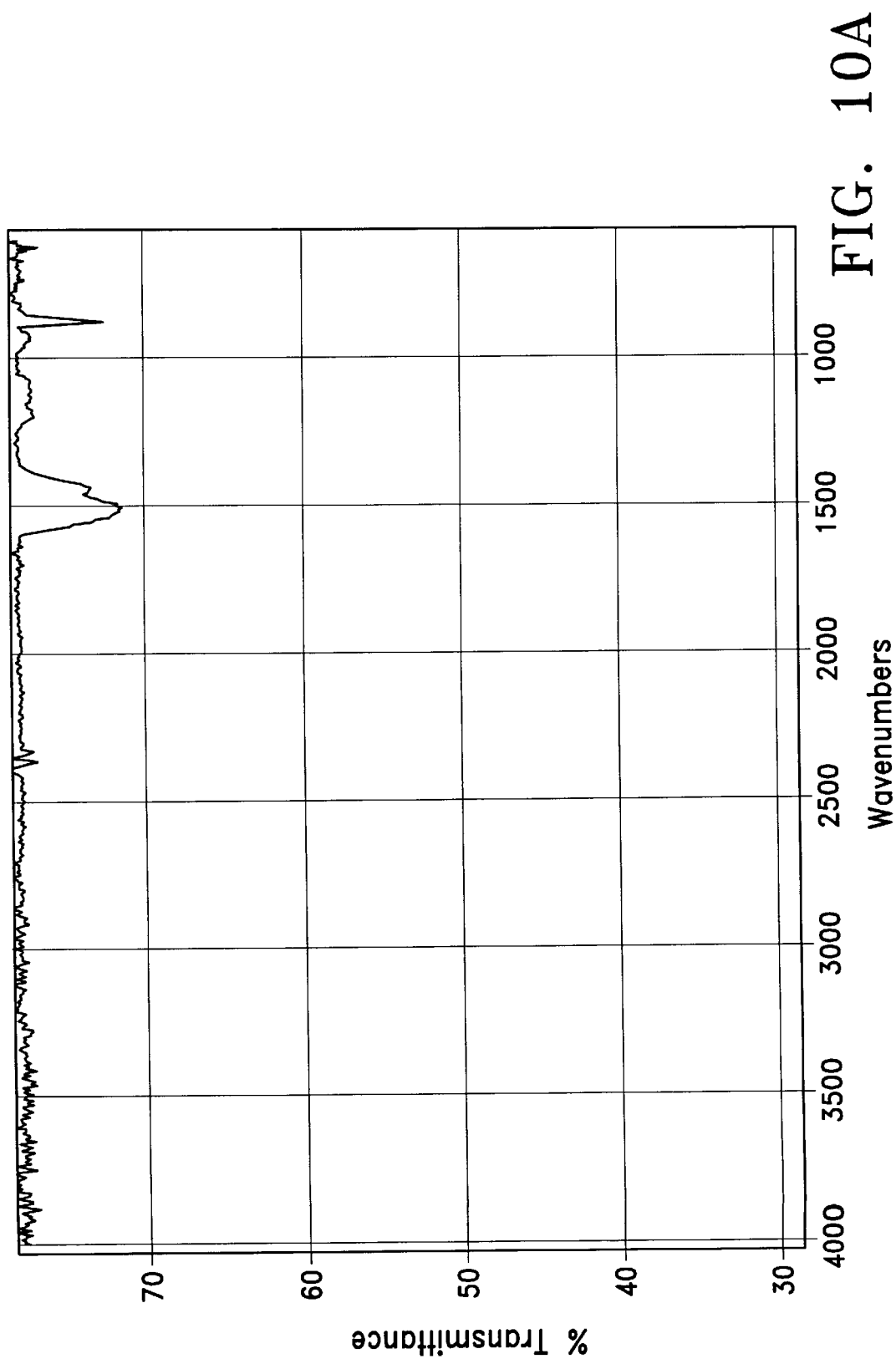
Figure 10B:
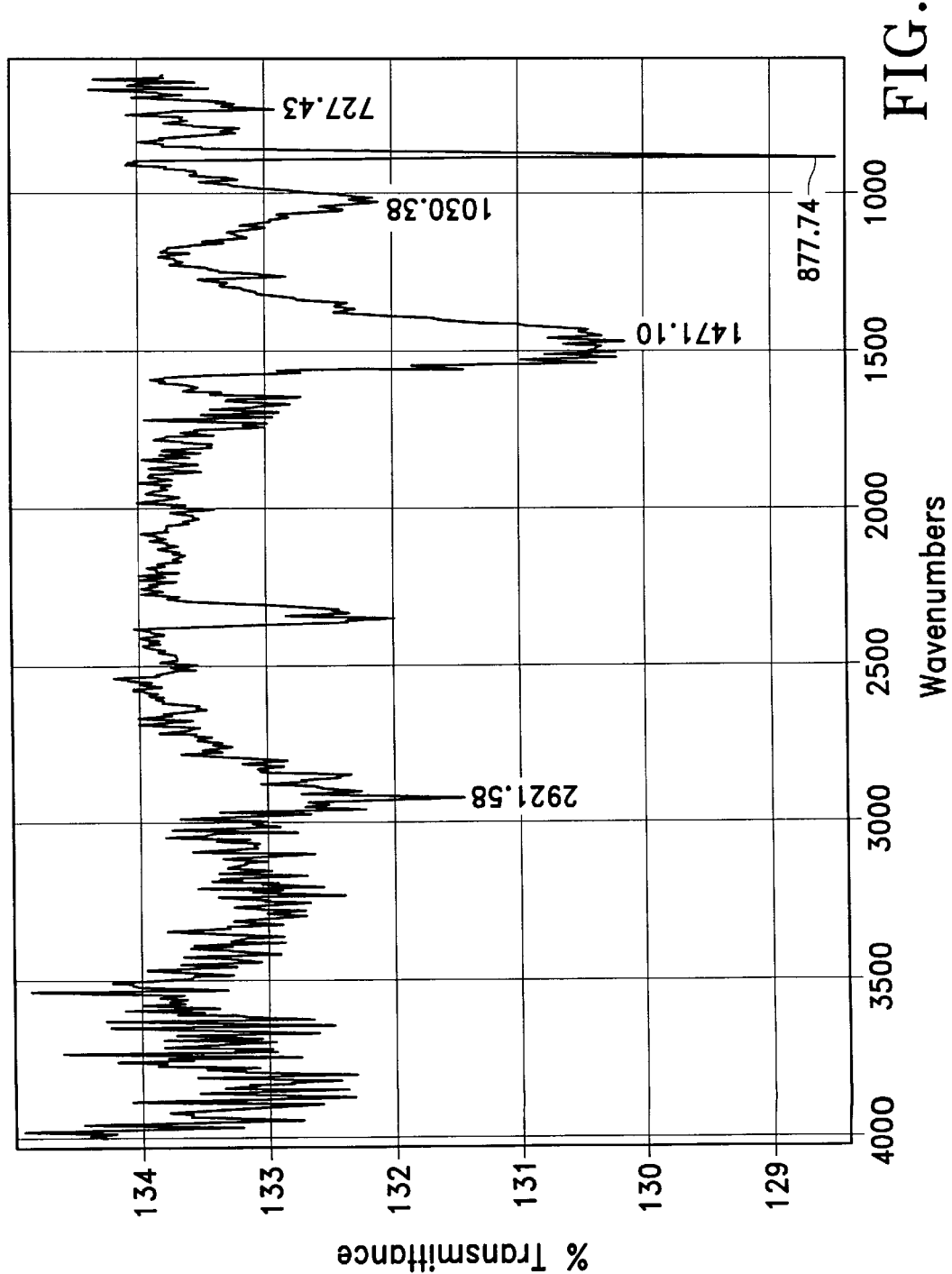

The spectrum of the untreated lithium surface shows bands at 1510, 1435 and 875 cm$^{-1}$ assignable to the presence of an oxide layer on the surface of the lithium foil (FIG. 10A). After deposition of a surface film the spectrum shows three new bands (very weak) at 2920, 1015 and 725 cm$^{-1}$ (FIG. 10B) showing the formation of a surface film on the lithium surface. These bands are not assignable to the presence of adsorbed or absorbed acetylene on the surface, as bands due to neither the triple C≡C bond stretch or acetylenic C—H bond stretch are observed. This indicating that the nature of the film is structurally different to the source material, acetylene.

From these bands only limited conclusions may be reached regarding the exact nature of the surface film. The band at 2920 cm$^{-1}$ is in the region expected for the stretching vibrations of aliphatic C—H bonds. Therefore, the observed frequencies better correspond to the presence of alkane or vinyl C—H bonds in the surface layer. The evidence thus suggests that the monomeric acetylene vapor source reacts with the surface of the lithium foil, with reduction of the triple bond and formation of surface compounds with Li—C bonds. Although the characteristic bands at 1015 and 740 cm$^{-1}$ of polyacetylene or oligoacetylene films are not observed, the presence of such species cannot be discounted as these bands can easily be masked by noise in the weak spectra obtained or broadened due to lithium doping.

While the invention has been described in detail and with reference to specific embodiments thereof, it will be apparent to one skilled in the art that various changes and modifications can be made without departing from the spirit and scope thereof.

We claim:

1. A method for making a battery cell, said method comprising:

(a) providing a lithium anode having a lithium surface;

(b) providing a non-aqueous organic electrolyte containing a dissolved lithium salt;

(c) depositing on said lithium surface an anode stabilizing film, wherein said anode stabilizing film is deposited by vacuum deposition using a monomeric or oligomeric starting material, and wherein said anode stabilizing film has a chemical structure which is different than the chemical structure of said monomeric or oligomeric starting material; and, (d) providing a cathode comprising a cathode active material;

wherein:
        said anode stabilizing film is interposed between said lithium anode and said electrolyte; and,
        said electrolyte is interposed between said anode stabilizing film and said cathode.

2. The method of claim 1, wherein said anode stabilizing film has a thickness in the range of 0.01 to 10 micrometers.

3. The method of claim 1, wherein said anode stabilizing film has a thickness in the range of 0.01 to 0.1 micrometers.

4. The method of claim 1, wherein said anode stabilizing film has a thickness in the range of 0.1 to 5.0 micrometers.

5. The method of claim 1, wherein said anode stabilizing film is deposited on said lithium surface by vacuum deposition using a monomeric starting material, and wherein said monomeric starting material is acetylene.

6. The method of claim 5, wherein said anode stabilizing film is deposited at a temperature of 25° C. or greater.

7. The method of claim 5, wherein said anode stabilizing film is deposited at a temperature of 100° C. or greater.

8. The method of claim 1, wherein said anode stabilizing film is deposited on said lithium surface by plasma-assisted vacuum evaporation.

9. The method of claim 1, wherein said anode stabilizing film is deposited on said lithium surface by vacuum deposition using a conjugated oligomeric starting material.

10. The method of claim 9, wherein said conjugated oligomeric starting material is selected from the group consisting of: poly(p-phenylene), polyacetylene, poly (phenylene vinylene), polyazulene, poly(perinaphthalene), polyacenes, and poly(naphthalene-2,6-diyl).

11. The method of claim 1, wherein said electrolyte is a non-aqueous liquid electrolyte containing a dissolved lithium salt.

12. The method of claim 1, wherein said electrolyte is a polymer electrolyte containing a dissolved lithium salt.

13. The method of claim 12, wherein said polymer electrolyte is a single-ion conducting polymer electrolyte.

14. The method of claim 12, wherein said polymer electrolyte is a gel polymer electrolyte.

15. The method of claim 1, wherein said lithium salt is selected from the group consisting of: LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, LiN(SO$_2$CF$_3$)$_2$, and lithium salts of fluorosulfonated phenols and pyrroles.

16. The method of claim 1, wherein said cathode comprises a cathode active material selected from the group consisting of: inorganic insertion oxides, inorganic insertion sulfides, organo-sulfur compounds and conjugated polymers.

17. The method of claim 1, wherein said cathode active material comprises elemental sulfur.

18. The method of claim 16, wherein said cathode active material comprises an organ-sulfur compound.

19. The method of claim 1, wherein said battery cell further comprises a current collector for said anode, a separate current collector for said cathode and suitable encapsulation to prevent the penetration of air and moisture.

20. A method for making a battery cell, said method comprising:

(a) providing a lithium anode having a lithium surface;

(b) providing a non-aqueous organic electrolyte containing a dissolved lithium salt;

(c) depositing on said lithium surface an electrically conducting crosslinked polymer film by vacuum deposition using a monomeric or oligomeric starting material, and wherein said polymer film has a chemical structure which is different than the chemical structure of said monomeric or oligomeric starting material; and, (d) providing a cathode comprising a cathode active material;

wherein:
  said polymer film is interposed between said lithium anode and said electrolyte;
  said electrolyte is interposed between said polymer film and said cathode; and,
  said polymer film is capable of transmitting lithium ions between said lithium anode and said electrolyte.

21. The method of claim 20, wherein said electrically conducting crosslinked polymer film is deposited on said lithium surface by plasma-assisted vacuum evaporation.

22. The method of claim 20, wherein said electrically conducting crosslinked polymer film is deposited on said lithium surface using a conjugated oligomeric starting material.

23. The method of claim 22, wherein said conjugated oligomeric starting material is selected from the group consisting of: poly(p-phenylene), polyacetylene, poly(phenylene vinylene), polyazulene, poly(perinaphthalene), polyacenes, and poly(naphthalene-2,6-diyl).

24. The method of claim 20, wherein said electrolyte is a non-aqueous liquid electrolyte containing a dissolved lithium salt.

25. The method of claim 20, wherein said electrolyte is a polymer electrolyte containing a dissolved lithium salt.

26. The method of claim 25, wherein said polymer electrolyte is a single-ion conducting polymer electrolyte.

27. The method of claim 25, wherein said polymer electrolyte is a gel polymer electrolyte.

28. The method of claim 20, wherein said lithium salt is selected from the group consisting of: $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2$, and lithium salts of fluorosulfonated phenols and pyrroles.

29. The method of claim 20, wherein said cathode comprises a cathode active material selected from the group consisting of: inorganic insertion oxides, inorganic insertion sulfides, organo-sulfur compounds and conjugated polymers.

30. The method of claim 20, wherein said cathode active material comprises elemental sulfur.

31. The method of claim 29, wherein said cathode active material comprises an organo-sulfur compound.

32. The method of claim 20, wherein said battery cell further comprises a current collector for said anode, a separate current collector for said cathode and suitable encapsulation to prevent the penetration of air and moisture.

33. A method for making a battery cell, said method comprising:

(a) providing a lithium anode having a lithium surface;

(b) providing a non-aqueous organic electrolyte containing a dissolved lithium salt;

(c) depositing on said lithium surface a lithium ion conducting polymer film by vacuum deposition using a monomeric or oligomeric starting material, and wherein said polymer film has a chemical structure which is different than the chemical structure of said monomeric or oligomeric starting material; and, (d) providing a cathode comprising a cathode active material;

wherein:
  said polymer film is interposed between said lithium anode and said electrolyte;
  said electrolyte is interposed between said polymer film and said cathode; and,
  said polymer film is doped electrically conductive by incorporation of lithium ions, is capable of transmitting lithium ions between said lithium anode and said electrolyte, is capable of stabilizing said lithium anode against formation of dendrites, is capable of dissolving dendrites, and is capable of stabilizing said lithium anode against reaction with said electrolyte to form a more resistive interfacial layer.

34. The method of claim 33, wherein said lithium ion conducting polymer film is deposited on said lithium surface using a monomeric starting material, and said monomeric starting material is acetylene.

35. The method of claim 33, wherein said lithium ion conducting polymer film is deposited on said lithium surface by plasma-assisted vacuum evaporation.

36. The method of claim 33, wherein said lithium ion conducting polymer film is deposited on said lithium surface using a conjugated oligomeric starting material.

37. The method of claim 36, wherein said conjugated oligomeric starting material is selected from the group consisting of: poly(p-phenylene), polyacetylene, poly(phenylene vinylene), polyazulene, poly(perinaphthalene), polyacenes, and poly(naphthalene-2,6-diyl).

38. The method of claim 33, wherein said electrolyte is a non-aqueous liquid electrolyte containing a dissolved lithium salt.

39. The method of claim 33, wherein said electrolyte is a polymer electrolyte containing a dissolved lithium salt.

40. The method of claim 39, wherein said polymer electrolyte is a single-ion conducting polymer electrolyte.

41. The method of claim 39, wherein said polymer electrolyte is a gel polymer electrolyte.

42. The method of claim 33, wherein said lithium salt is selected from the group consisting of: $LiClO_4$, $LiAsF_6$, $LiSO_3CF_3$, $LiSO_3CH_3$, $LiBF_4$, $LiB(Ph)_4$, $LiPF_6$, $LiC(SO_2CF_3)_3$, $LiN(SO_2CF_3)_2$, and lithium salts of fluorosulfonated phenols and pyrroles.

43. The method of claim 33, wherein said cathode comprises a cathode active material selected from the group consisting of: inorganic insertion oxides, inorganic insertion sulfides, organo-sulfur compounds and conjugated polymers.

44. The method of claim 33, wherein said cathode active material comprises elemental sulfur.

45. The method of claim 43, wherein said cathode active material comprises an organo-sulfur compound.

46. The method of claim 33, wherein said battery cell further comprises a current collector for said anode, a separate current collector for said cathode and suitable encapsulation to prevent the penetration of air and moisture.

47. A method for making a battery cell, said method comprising:

(a) providing a lithium anode;

(b) providing a non-aqueous polymer electrolyte containing a dissolved lithium salt and having an electrolyte surface;

(c) depositing on said electrolyte surface an electrically conducting crosslinked polymer film by vacuum deposition using a monomeric or oligomeric starting material, and wherein said polymer film has a chemical structure which is different than the chemical structure of said monomeric or oligomeric starting material; and, (d) providing a cathode comprising a cathode active material;

wherein:
said polymer film is interposed between said lithium anode and said electrolyte;
said electrolyte is interposed between said polymer film and said cathode; and,
said polymer film is capable of transmitting lithium ions between said lithium anode and said electrolyte.

48. The method of claim 47, wherein said electrically conducting crosslinked polymer film is deposited on said electrolyte surface by plasma-assisted vacuum evaporation.

49. The method of claim 47, wherein said electrically conducting crosslinked polymer film is deposited on said electrolyte surface using a conjugated oligomeric starting material.

50. The method of claim 49, wherein said conjugated oligomeric starting material is selected from the group consisting of: poly(p-phenylene), polyacetylene, poly (phenylene vinylene), polyazulene, poly(perinaphthalene), polyacenes, and poly(naphthalene-2,6-diyl).

51. A method for making a battery cell, said method comprising:
(a) providing a lithium anode;
(b) providing a non-aqueous polymer electrolyte containing a dissolved lithium salt and having an electrolyte surface;
(c) depositing on said electrolyte surface a lithium ion conducting polymer film by vacuum deposition using a monomeric or oligomeric starting material, and wherein said polymer film has a chemical structure which is different than the chemical structure of said monomeric or oligomeric starting material; and,
(d) providing a cathode comprising a cathode active material;
wherein:
said polymer film is interposed between said lithium anode and said electrolyte;
said electrolyte is interposed between said polymer film and said cathode; and,
said polymer film is doped electrically conductive by incorporation of lithium ions, is capable of transmitting lithium ions between said lithium anode and said electrolyte, is capable of stabilizing said lithium anode against formation of dendrites, is capable of dissolving dendrites, and is capable of stabilizing said lithium anode against reaction with said electrolyte to form a more resistive interfacial layer.

52. The method of claim 51, wherein said lithium ion conducting polymer film is deposited on said electrolyte surface by plasma-assisted vacuum evaporation.

53. The method of claim 51, wherein said lithium ion conducting polymer film is deposited on said electrolyte surface using a conjugated oligomeric starting material.

54. The method of claim 53, wherein said conjugated oligomeric starting material is selected from the group consisting of: poly(p-phenylene), polyacetylene, poly (phenylene vinylene), polyazulene, poly(perinaphthalene), polyacenes, and poly(naphthalene-2,6-diyl).

55. The method of claim 51, wherein said lithium ion conducting polymer film is deposited on said electrolyte surface using a monomeric starting material, and said monomeric starting material is acetylene.

* * * * *